US007729480B1

(12) United States Patent
Packingham et al.

(10) Patent No.: US 7,729,480 B1
(45) Date of Patent: Jun. 1, 2010

(54) METHOD AND SYSTEM FOR MULTI-MODAL INTERACTION

(75) Inventors: Kevin Packingham, Overland Park, KS (US); Jason Guesman, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 261 days.

(21) Appl. No.: 11/852,928

(22) Filed: Sep. 10, 2007

Related U.S. Application Data

(62) Division of application No. 10/074,513, filed on Feb. 12, 2002, now Pat. No. 7,286,651.

(51) Int. Cl.
*H04M 1/64* (2006.01)

(52) U.S. Cl. ...................... 379/88.14; 370/352; 379/52; 379/202.01; 455/412.1; 455/456.1; 455/458; 455/466; 709/206; 725/134

(58) Field of Classification Search ................ 345/748; 379/88.14, 202.01, 210.01, 52; 455/412.1, 455/456, 458, 466; 725/134; 726/10; 370/352; 709/206
See application file for complete search history.

(56) References Cited

U.S. PATENT DOCUMENTS 5,297,183 A 3/1994 Bareis et al.
5,659,597 A 8/1997 Bareis et al.
5,754,736 A 5/1998 Aust
5,987,100 A * 11/1999 Fortman et al. .......... 379/88.14
6,061,440 A * 5/2000 Delaney et al. ........ 379/202.01
6,157,848 A 12/2000 Bareis et al.
RE37,431 E 10/2001 Lanier et al.
6,334,103 B1 12/2001 Surace et al.
6,504,910 B1 * 1/2003 Engelke et al. ................ 379/52
6,560,576 B1 5/2003 Cohen et al.
6,704,024 B2 3/2004 Robotham et al.
6,851,060 B1 * 2/2005 Shrader ....................... 726/10
6,859,451 B1 * 2/2005 Pasternack et al. .......... 370/352
6,880,171 B1 * 4/2005 Ahmad et al. ............... 725/134
6,925,307 B1 * 8/2005 Mamdani et al. ............ 455/466
6,944,592 B1 9/2005 Pickering
7,233,655 B2 * 6/2007 Gailey et al. ........... 379/210.01
7,254,384 B2 * 8/2007 Gailey et al. ............. 455/412.1
7,499,716 B2 * 3/2009 Helferich .................... 455/458
7,640,006 B2 * 12/2009 Portman et al. .......... 455/412.1
2002/0112007 A1 * 8/2002 Wood et al. ................. 709/206
2002/0119793 A1 * 8/2002 Hronek et al. ............. 455/466

(Continued)

OTHER PUBLICATIONS

U.S. Appl. No. 09/934,121, filed Aug. 21, 2001, Byrne, William.

(Continued)

*Primary Examiner*—Gerald Gauthier

(57) ABSTRACT

A method and system manages content delivery to a multi-modal client device. The system may include a session manager logically connected between a server and the client device. The session manager can maintain a record of the state of a user's session, and if the user or the client device switches from an initial presentation mode to a second presentation mode, the session manager can use the record to effect a seamless transfer from the initial presentation mode to the subsequent presentation mode. The session manager may also transcode content delivered to the client device so that the content is compatible with the presentation mode selected by the user.

14 Claims, 3 Drawing Sheets

START
Establish Session Between Content Server & Client Device — 40
Display Content In Format Of First Presentation Mode While In A State Of The Session — 42
Store A Record Associated With The Client Device Identifying The State Of The Session — 44
Receive Mode-Switching Signal From The Client Device — 46
Determine If Client Device Is Authorized To Receive Content Formatted For Requested Presentation Mode — 48
Transcode Content To Format Of Requested Presentation Mode If Necessary — 50
Retrieve State Record Associated With Client Device — 52
Route Content To Applicable Presentation System While Continuing The State Of The Session — 54
RETURN

U.S. PATENT DOCUMENTS

| | | | | |
|---|---|---|---|---|
| 2002/0137491 | A1 * | 9/2002 | Pentikainen et al. | 455/412 |
| 2003/0008661 | A1 * | 1/2003 | Joyce et al. | 455/456 |
| 2003/0146932 | A1 * | 8/2003 | Weng et al. | 345/748 |

OTHER PUBLICATIONS

U.S. Appl. No. 09/823,999, filed Apr. 3, 2001, Pugliese, Anthony.
U.S. Appl. No. 09/782,933, filed Feb. 14, 2001, Raghunandan, Hulikunta.
U.S. Appl. No. 09/947,438, filed Sep. 7, 2001, Ishikawa et al.
U.S. Appl. No. 09/767,011, filed Jan. 22, 2001, Usitalo et al.
Project P929-PF, “Multilingual Web sties: Best practice, guidelines and architectures,” vol. 4 of 5: Annex C, pp. 1-35, Sep. 2000.
TelIme Studio—Examples, http://studio.tellme.com/library/code/ex-103, printed from the World Wide Web on Jun. 26, 2001.
The Portal Pushers: Speech Vendors Poised to grow the Voice Web, http://www.computertelephony.com/article/printableArticle?doc_id=CTM20001201S002, printed from the World Wide Web on Jun. 28, 2001.
ArsDigita Systems Journal: Voice XML: letting people talk to your HTTP server through the telephone, http://arsdigita.com/asj/vxml/, printed from the World Wide Web on Jun. 28, 2001.
IBM, “IBM WebSphere Voice Server Software Developers Kit (SDK) Programmer’s Guide”. Version 1.5, Chapter 4, pp. 93-172, Apr. 2001.
New Onebox Solution—DLD 123-052, http://www.thedigest.com/more/123/123-052.html, printed from the World Wide Web on Sep. 5, 2001.
Smart Computing-Editorial, http://www.smartcomputing.com/editorial/article.asp?article=articles%2Farchive%2F10608%2F09108%2F09108%2Easp, printed from the World Wide Web on Sep. 5, 2001.
2 Overview, http://cafe.bevocal.com/docs/grammar/grammar2.html, printed from the World Wide Web on Sep. 5, 2001.
Preface, http://cafe.bevocal.com/docs/grammar/preface.html, printed from the World Wide Web on Sep. 5, 2001.
1 Nuance Grammars, http://cafe.bevocal.com/docs/grammar/gsl.html, printed from the World Wide Web on Sep. 5, 2001.
<alias>, http://cafe.bevocal.com/docs/grammar/xml2.html, printed from the World Wide Web on Sep. 5, 2001.
<example>, http://cafe.bevocal.com/docs/grammar/xml3.html, printed from the World Wide Web on Sep. 5, 2001.
<grammar>, http://cafe.bevocal.com/docs/grammar/xml4.html, printed from the World Wide Web on Sep. 5, 2001.
<item>, http://cafe.bevocal.com/docs/grammar/xml5.html, printed from the World Wide Web on Sep. 5, 2001.
<one-of>, http://cafe.bevocal.com/docs/grammar/xml6.html, printed from the World Wide Web on Sep. 5, 2001.
<rule>, http://cafe.bevocal.com/docs/grammar/xml7.html, printed from the World Wide Web on Sep. 5, 2001.
<ruleref>, http://cafe.bevocal.com/docs/grammar/xml8.html, printed from the World Wide Web on Sep. 5, 2001.
<tag>, http://cafe.bevocal.com/docs/grammar/xml9.html, printed from the World Wide Web on Sep. 5, 2001.
<token>, http://cafe.bevocal.com/docs/grammar/xml10.html, printed from the World Wide Web on Sep. 5, 2001.

* cited by examiner

METHOD AND SYSTEM FOR MULTI-MODAL INTERACTION

RELATED APPLICATION

This application is a divisional of U.S. patent application Ser. No. 10/074,513, filed on Feb. 12, 2002; the disclosure of which is explicitly incorporated by reference herein.

BACKGROUND

1. Field of the Invention

The present invention relates to telecommunications and, more particularly, to managing client/server interactions.

2. General Background

Many people are increasingly relying on World Wide Web resources to obtain information. Many wireless communication devices, such as wireless telephones and wireless PDAs, are now capable of accessing the World Wide Web. In general, such wireless devices can serve as wireless client devices in sessions with servers. During such sessions, the wireless client devices receive, via an air interface, content formatted for a given presentation mode. Such content may include voice, text, graphics, data and/or other media.

The presentation mode refers to the way a user-interface of a wireless device presents content to the user. For example, the wireless device may have a browser function to allow the content to be presented in a screen-based presentation mode, e.g., to be displayed one screen at a time. Content for such a screen-based presentation mode is often written in a markup language, such as Wireless Markup Language (WML) or Handheld Device Markup Language (HDML), to facilitate the transmission of data over wireless networks and to facilitate the display of content on the smaller screens that handheld wireless devices typically use.

Presentation modes other than screen-based modes are available in some wireless devices. For example, some wireless devices can use a voice-based presentation mode, in which the wireless device presents the content to the user as voice. Such content may be written in a voice-based markup language, such as the Voice Extensible Markup Language (VXML), to facilitate voice-based presentation. Some client devices are capable of both voice-based and screen-based content presentation. In other words, they are multi-modal, in that they are able to present content to users in more than one presentation mode.

SUMMARY

It may be desirable for a user of a multi-modal device to switch from one presentation mode to another mode in the middle of a session. However, switching presentation modes in the middle of a session could cause the state of the user's session to be lost. For example, if the user interacted with a server (e.g., by entering data) during the session while in one presentation mode, any data entered during the interaction would have to be re-entered after the user switched to a different presentation mode. Moreover, a server may be capable of delivering content in one format, but not another, in which case the user could not switch presentation modes without some specialized equipment or software to manage the switchover.

It is possible to keep track of a user's session state by storing information about it in the client device, but this requires a specialized client device and could use client device resources that could be better used to provide other functions, especially if the client device is small. Thus, a system for managing the switching of presentation modes, maintaining session state information without requiring specialized client devices, and presenting content in whatever format the user requests would be desirable.

In a first principal aspect, an exemplary embodiment of the present invention provides a method for multi-modal content delivery. The method comprises establishing a session between a server and a client device and delivering content, formatted for a first presentation mode, to the client device. A state record associated with the client device is stored, the state record identifying a state of the session. The method also includes the steps of receiving a mode-switching signal from the client device, and in response to the mode-switching signal, continuing the session in the state by 1) using the state record to reproduce the state of the session; and 2) delivering content, formatted for a second presentation mode, to the client device.

In a second principal aspect, the exemplary embodiment provides a system for delivering content to a client device while the client device is in a session with a server. The system includes a wireless access network for communicating with the client device over an air interface and a first presentation system for delivering content, formatted for a first presentation mode, to the wireless access network. The system further includes a second presentation system for delivering content, formatted for a second presentation mode, to the wireless access network, and a session manager for transmitting content from the server to the first presentation system and to the second presentation system. The session manager can store a state record associated with the client device, where the state record would identify a state of the session. By storing the state record, the session manager can reproduce the state of the session if the user switches from the first presentation mode to the second presentation mode, which could be different from the first presentation mode.

In a third principal aspect, the exemplary embodiment provides a session manager for managing multi-modal content delivery in a network that includes at least a first presentation system and a second presentation system. The session manager may include a processor, a memory, and a network interface by which content from a network may be received. The session manager may further include a mode-switching module of machine instructions stored in the memory. The mode-switching module is executable by the processor to receive a mode-switching signal to initiate a switchover from the first presentation system to the second presentation system and, in response, to transmit the content to the second presentation system.

In a fourth principal aspect, the exemplary embodiment provides a session manager for managing multi-modal content delivery to at least a first presentation system and at least a second presentation system, where the session manager includes: a processor; a memory; a network interface by which content from a network may be received; and a session state storage module of machine instructions stored in the memory that is executable by the processor to maintain a record of a session state. The session state defines the state of a user's session before a switchover from the first presentation system to the second presentation system, and the record includes a navigation point that identifies a specific resource available from the network. The record further includes data entered by the user prior to the switchover.

The session manager may also include a mode-switching module of machine instructions stored in the memory that is executable by the processor to receive a mode-switching signal and to responsively initiate the switchover and transmit the content to the second presentation system. The mode-switching module may also be used to reproduce the session state after the switchover; reproducing the session state includes transmitting the data entered by the user prior to the switchover to the second presentation system. The session manager further includes a transcoding module of machine instructions stored in the memory; the transcoding module is executable by the processor to transcode the content into a format compatible with the first presentation system or the second presentation system.

These as well as other aspects and advantages of the present invention will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

Figure 1:
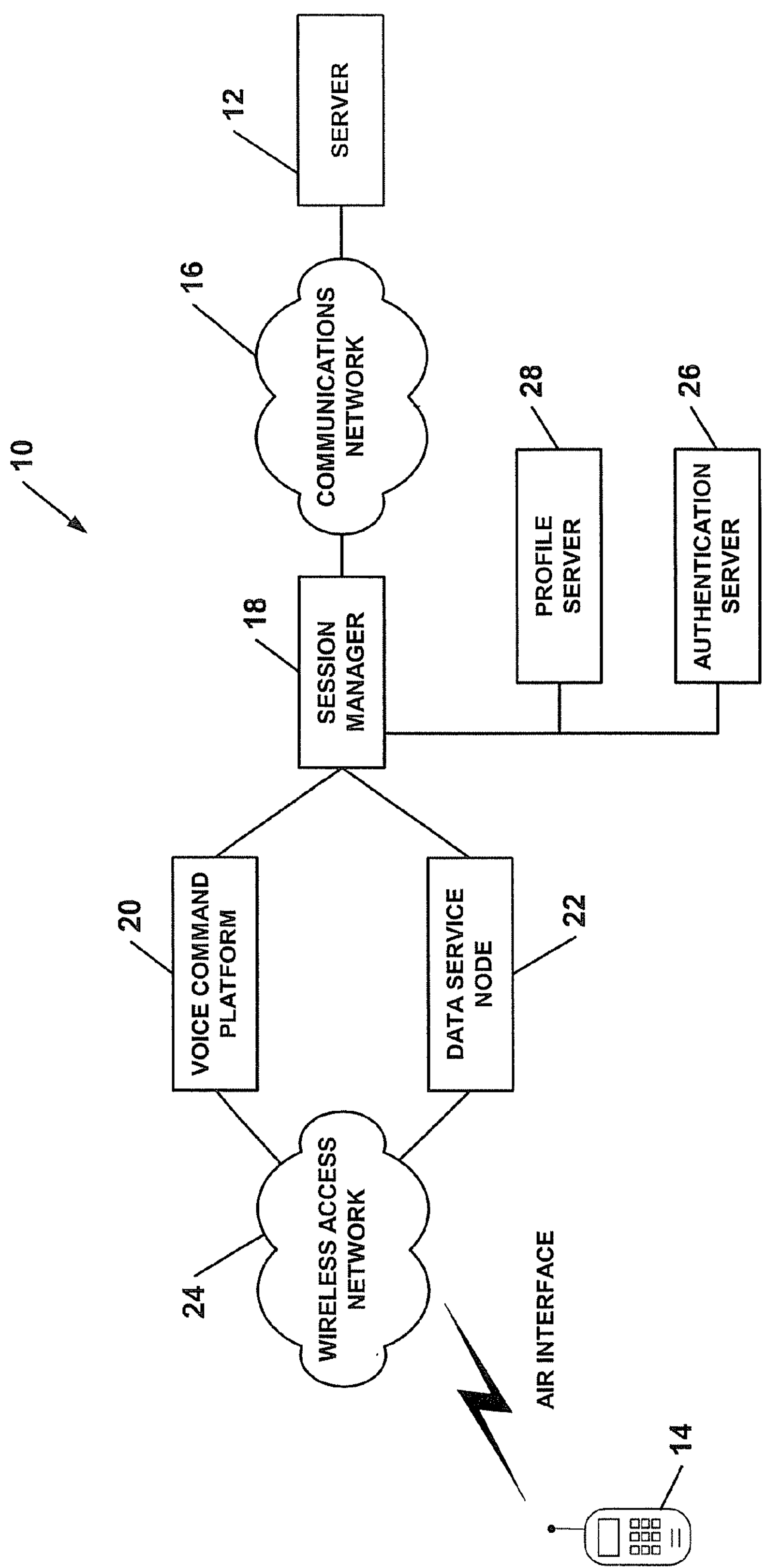
FIG. 1 is a simplified diagram that illustrates a system in which the exemplary embodiments can be employed.

In multi-modal devices, it is important to be able to manage switchovers between two or more presentation modes. In particular, it would be desirable to allow a user to change presentation modes seamlessly in the midst of a single session. For example, during a session in which the user is receiving content using a voice-based presentation mode, the user may decide to switch over to a screen-based presentation mode, or vice-versa, without losing any data already entered, and without navigating back to the same place in the session where the user was before switching presentation modes.

In an exemplary embodiment of the present invention, multi-modal content delivery can be managed by a session manager that is logically connected between the server and two or more presentation systems that deliver content in a particular presentation mode to a communication device. An example of one such presentation system is a voice-command platform, which provides content formatted for voice-based presentation. Another presentation system is a data service node, which provides content formatted for screen-based presentation.

To provide seamless delivery of multi-modal content during switchovers, the session manager keeps track of the state of a user's session. The state of the session could be defined by a set of one or more saved variables. Thus, a session state may consist of a saved URL, or it may include more or different information. If a user is involved in a "passive" session, the saved variables that represent the session state might include mainly information that defines a web page, such as a URL, and might also define the user's location on that particular web page, such as a fragment identifier.

In contrast to passive sessions, users may be engaged in interactive web sessions. In an interactive session, a user might provide input to a server, rather than just receive content from the server; in this case, the session state could include more information than simply that required to define a location on a web page. For example, if a user were conducting a credit card transaction via a web site and had entered his first name, last name, and credit card number (but not his address), that information, and also the point of the next expected data entry would be used to characterize the session state. Of course, this information would not be associated with any other user or session. Thus, if the user were to log off the web site (or simply navigate to a different web page before completing the credit card transaction) prior to entering any more information and then log back on, the user would have to navigate back to the point where data entry began and re-enter his name and credit card number in order to be in the same session state.

Similarly, when a user of a multi-modal client device switches presentation modes during a client/server session, the same thing may happen: the user must re-navigate and re-enter, because session state is lost. Storing the user's session state and also storing a cache of the content most recently presented to the user overcomes this problem: when the presentation mode is switched, the stored session data and, if necessary, the cached content, can be used to reproduce the session state in the new presentation mode. In the example, if the user switched from screen-based presentation mode to voice-based mode, he could speak his address without going back to re-enter (by speaking) his name and credit card number, and the transaction would be complete upon submission of the data, exactly as if the user had been in voice-based presentation mode all along; the switch from one presentation mode to another will have been 120 seamless. Similarly, if the user switched from voice-based to screen-based presentation mode, the stored session data and the cached content could be combined to visually present to the user the input already entered in the context of the screen-based content. In other words, both the entered data and the data entry page could be displayed to the user as if the user had been in screen-based mode all along.

The exemplary embodiment could also provide virtually uninterrupted sessions for users. For instance, if a client device is wireless, the user could experience a loss of coverage (due to interference in the wireless access network, for example) and the session could be lost—the equivalent of discontinuing a web session on a personal computer by shutting down the computer. In the exemplary embodiment, the user could still resume the session at the same state 130 that the session was in when the loss of coverage occurred, so long as the session is resumed at any time within the storage period defined by a system provider. The system provider could set virtually any time period for maintaining records associated with client devices—the only limit would be the provider's system resources. For example, 20 minutes is typical, because a user may want to start a new web session after that length of time. Of course, the provider's system could prompt the user to either resume a previous session or start a new one after a session is interrupted due to a loss of coverage (or for any other reason).

Storing session state at the network level, rather than at the client device, has an advantage: seamless switchovers can be made without regard to the client device. In other words, a system provider could supply its customers with multi-modal client devices from any number of manufacturers without requiring specialized hardware or software, without increasing the cost of customer equipment, and without limiting the customer's equipment choices.

Further, due to the processing power and memory capacity available at the network level, a device such as a session manager that is used to implement seamless switchovers could also be used to "transcode" content provided by servers on a network (such as the Internet). Transcoding simply means that content or commands are converted from one protocol or markup language to another. With transcoding, a wireless client device that uses the Wireless Application Protocol (WAP) to receive content in WML can access web servers that use Hypertext Transfer Protocol (HTTP) and that deliver content in another format, such as Hypertext Markup Language (HTML), regardless of the server's format. For example, if the user requests a particular Uniform Resource Locator (URL) via the client device's WAP browser, the session manager can translate the WAP request into an HTTP request, and the web server could respond to the request just as it would to any other HTTP request, returning either WML or HTML content to the session manager. The session manager would then transmit the content to the client device. If the server returned HTML, the session manager could transcode the content to WML so that the client device could present it to the user. Other protocols/markup languages could be transcoded as well. If the server returned WML content, no transcoding would be needed, and the session manager could forward the content to the client device for presentation.

Referring now to the drawings, FIG. 1 illustrates a system 10 in which the exemplary embodiments can be employed. In system 10, server 12 delivers content to and interacts with a communication device, such as wireless client device 14, via a network or networks and various network elements, which could include: communications network 16 (which may be or may include the Internet); session manager 18; voice-command platform 20; data service node 22; and wireless access network 24. Wireless access network 24 communicates with wireless client device 14 via an air interface, as shown. Wireless access network 24 may include elements such as mobile switching centers, base transceiver stations, base station controllers, and/or other elements to provide network connectivity to wireless client devices in the system. To provide additional functionality, session manager 18 may also be logically connected to authentication server 26 and profile server 28. The functions performed by session manager 18, authentication server 26, and profile server 28 could be implemented with commercially available servers such as the Sun Solaris, Dell NT, IBM AIX, or other servers.

Voice-command platform 20 provides an interface between a voice-based communication device, such as a telephone, and a server that accepts non-voice-command inputs, such as server 12. Generally, voice-command platform 20 can receive spoken commands or data inputs from a user of wireless client device 14 and convert them to inputs that are recognized by server 12. In addition, voice-command platform 20 can receive content from server 12 and present it to the user as spoken responses to the user's queries or as voice prompts for further user inputs. For example, voice-command platform 20 could speak to the user the prompt: "Please enter your last name by spelling it." This is the voice-command equivalent to a text entry box that might be presented by server 12 to a user in screen-based presentation mode. In response to the prompt, the user could spell his or her last name, just as a screen-based user would type his or her last name.

Although a wireless communication device (i.e., wireless client device 14) is shown in the exemplary system for purposes of illustration, those skilled in the art will recognize that the invention could be carried out using virtually any communication device, wireless or non-wireless, such as a wireless PDA, a conventional PDA in a synchronization cradle, a personal computer, a dedicated internet appliance, or other devices. Moreover, the functions carried out by the various network entities shown, such as (without limitation) session manager 18, authentication server 26, voice-command platform 20, and data service node 22, could be performed by a single entity or multiple entities in combinations and configurations other than those shown. Thus, the entities illustrated may represent logical functions rather than physical devices without departing from the spirit and scope of the present invention.

In operation, content from server 12 could reach session manager 18 (via communications network 16) in WML, HDML, VXML, Extensible Markup Language (XML), or in another format. If the user initially requested the content in voice-presentation mode by, for example, speaking a command that is recognized by voice-command platform 20, session manager 18 would transmit the requested content to wireless client device 14 via voice-command platform 20. If the user subsequently requested to receive content in screen-based presentation mode, session manager 18 could maintain the same session with server 12 but could 200 reroute content to data service node 22 for delivery to wireless client device 14 in screen-based mode.

In transmitting content from server 12 to wireless client device 14 that will ultimately be presented to the user in the initial voice-command mode, session manager 18 could first transcode the content, if necessary, to a voice format, such as VXML. The transcoding could 205 also be done by voice-command platform 20 or by another network entity. Similarly, content that is to be delivered at wireless client device 14 for presentation in screen-based mode could be transcoded to WML HDML, etc., if required, at either data service node 22, session manager 18 or elsewhere. In addition to converting from one protocol or markup language to another, the transcoding may also include the removal of content that cannot be, or need not be, presented in a given mode. For example, transcoding may remove graphics that are present in the content but that could not be rendered satisfactorily on the relatively small screen of a handheld device.

In addition to providing an interface between wireless client device 14 and server 12, the session manager may also be logically connected to profile server 28 in addition to various other servers that provide the functionality of the exemplary embodiment; profile server 28 stores users' preferences for presentation and other data. Some examples of details that profile server 28 can manage are: users' preferred voice for voice-command mode; users' personal address books; bookmarks which function as user-specific shortcuts to URIs or menu items; e-mail; and users' calendars. Profile server 28 could also include indications of users' preferred content providers, such as a preferred e-mail provider, voice-mail provider, weather reporting provider, etc.

Session manager 18 may further be logically connected to authentication server 26, which can access the account information associated with wireless client device 14 to verify that any requested services are authorized.

Figure 2:
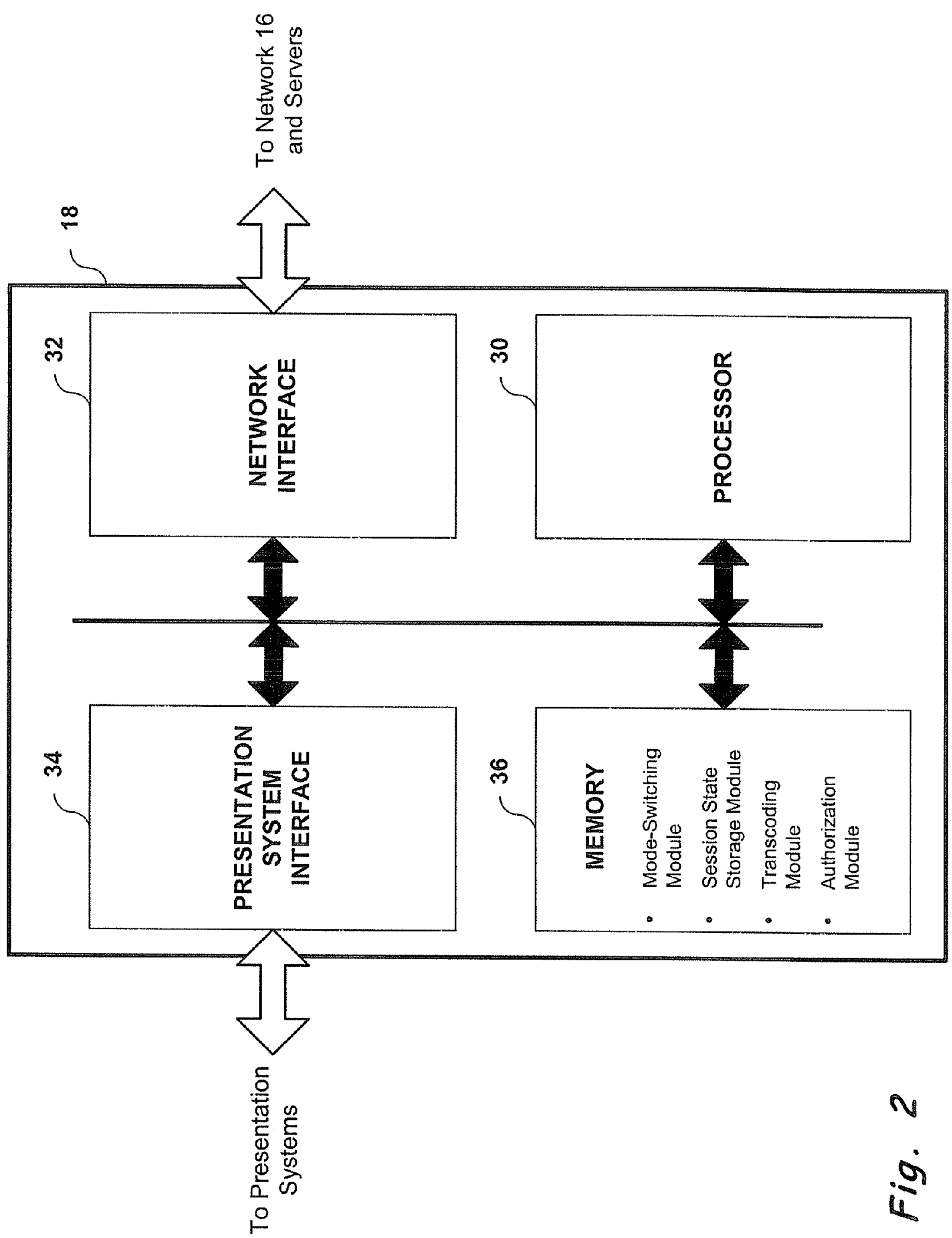
FIG. 2 is a simplified block diagram of a session manager that may be used with the exemplary embodiments.

FIG. 2 is a simplified diagram illustrating functional blocks that may be included within session manager 18. Generally, session manager 18 may include a processor 30, a network interface 32, a presentation system interface 34, and a memory 36, all communicatively interconnected. Processor 30 may include, for example, one or more integrated circuit microprocessors, and memory 36 may be a ROM, flash memory, non-volatile memory, etc. Alternatively, session manager 18 could be implemented using a device having a memory and processor contained in one integrated circuit.

Memory 36 may include more than one physical element, and may also include a number of software modules that are executable by processor 30 to carry out various functions described herein. These modules may include, but are not necessarily limited to, a mode-switching module, a session state storage module, a transcoding module, and a client device authorization module. Memory 36 may also include a state record that comprises the content associated with a session state as well as any required navigation indicators associated with the session state. The functionality of the various elements of session manager 18 can be best understood with reference to the flow chart of FIG. 3, as described below.

Figure 3:
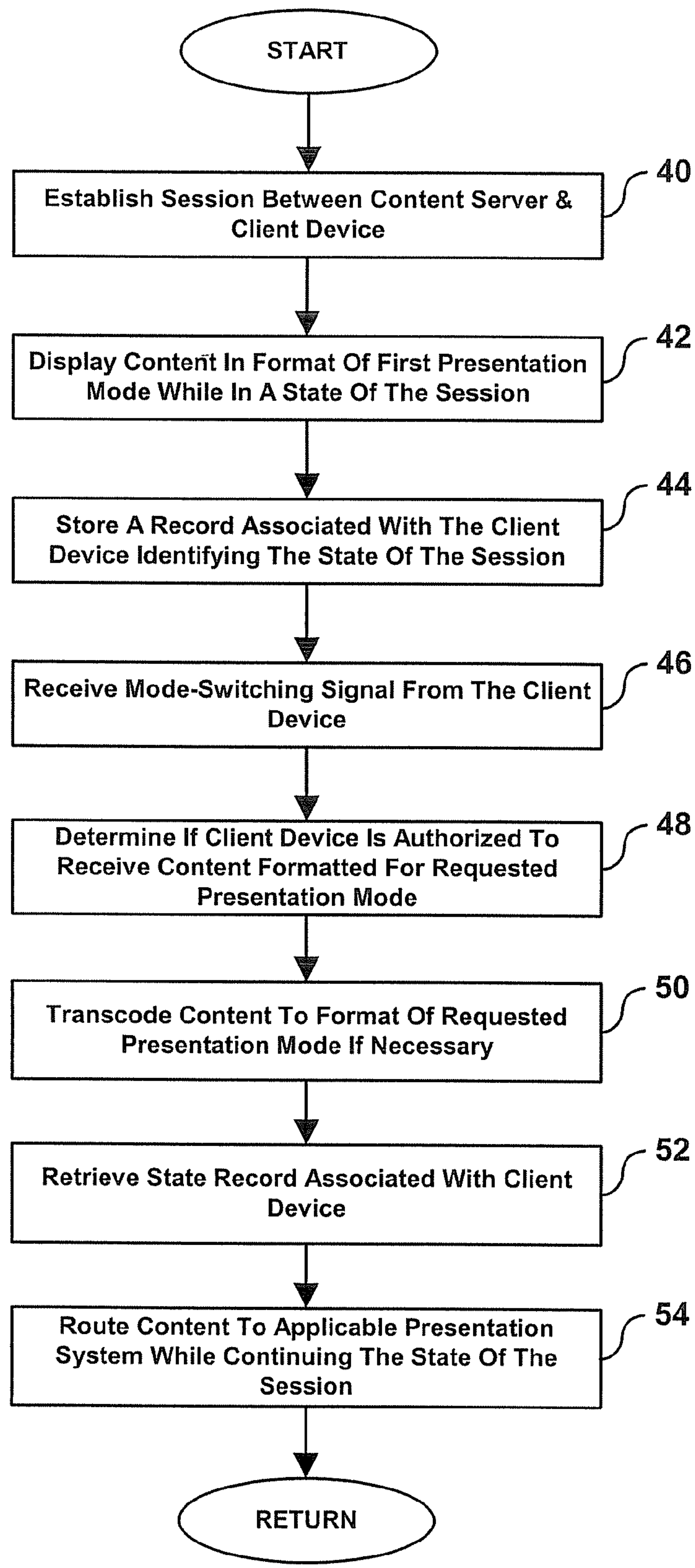
FIG. 3 is a flow chart of functions that may be carried out in accordance with the exemplary embodiments.

FIG. 3 is a flow chart of functions that may be carried out in accordance with the exemplary embodiment. At block 40, a session is established between server 12 and wireless client device 14 in response to a user's request. An initial presentation mode for the session may be used based on the user's request; the initial presentation mode will determine whether content is first delivered via voice-command platform 20 or data service node 22. If the content is to be delivered via voice-command platform 20, session manager 18 would route content from network interface 32 to voice-command platform 20 via presentation system interface 34, while screen-based content would be routed to data service node 22.

For purposes of illustration, assume that the user first initiates a voice-command session. As shown at block 42, content would be delivered in voice-based mode via voice-command platform 20 to wireless client device 14. Whenever the user changes the state of the session by navigation or data entry, for example, the session state storage module within session manager 18 can store a state record in memory 36 that identifies both the client device and the current state of the session. The state of the session may be identified by navigation points (e.g., uniform resource identifiers (URIs), menu items, URLs, fragment identifiers, etc.) that identify the specific session state or resource the client device is currently accessing, as illustrated at block 44. An example of a resource that might be represented by a navigation point is a unique web page, such as an HTML document. The multiple navigation points that constitute a navigation history could be stored in the state record, so that a user could execute numerous "back" commands from a browser or voice-command platform, and the back command would function properly even after the user switched presentation modes. The state record may also include any user input entered during the session.

As shown at block 46, the user (or wireless client device 14) may initiate a mode-switching signal that is received by session manager 18 at presentation system interface 34; the mode-switching signal indicates that the user wishes to change to a second or subsequent presentation mode, such as screen-based mode from voice-based mode, for example. The mode-switching module within session manager 18 can receive the mode-switching signal and responsively initiate the switchover from one presentation mode to a subsequent mode.

Conveniently, the mode-switching signal may take the form of (or be included in) a service request signal sent by wireless client device 14 that characterizes the requested communication as a packet-data communication, as compared with traditional voice 270 communication. Similarly, if the initial presentation mode were screen-based, a service request signal that would be used to switch to voice communication could be received by session manager 18 and used as the mode-switching signal.

Next, as shown by block 48, the authentication module in session manager 18 may forward the service request signal to authentication server 26 via network interface 32 to 275 determine whether wireless client device 14 is authorized to receive content in the requested presentation mode. In other words, the service request signal may be used to identify the client device and verify that it belongs to an authorized user. As shown by block 50, the transcoding module within session manager 18 can cause processor 30 to execute logic to transcode content received from server 12, if necessary, so that it is in a form usable by wireless client device 14. Alternatively, voice-command platform 20 or data service node 22 could transcode content from server 12 if necessary. As discussed above, transcoding is necessary when content must be changed before it can be presented in the mode desired by a user. As shown by block 52, session manager 18 can retrieve the state record associated with wireless client device 14. The state record may include any data entered by the user and may also include a history of navigation points from the session.

Session manager 18 then routes the content to the presentation system associated with the requested presentation mode, as shown by block 54. Voice-command platform 20 or data service node 22 can then deliver the content to wireless client device 14 in a second (or subsequent) presentation mode while continuing in the state of the session the user was in just prior to switching presentation modes.

To make this transfer seamless, session manager 18 uses the retrieved state record; upon receiving a request or data entry from wireless client device 14 after a switchover, session manager 18 (more specifically, the mode-switching module within session manager 18) can, in response to the request or entry, transmit the data represented by the session state record to the wireless client device 14 via the second presentation system. Thus, in the exemplary embodiments, the user will receive the same information and will be at the same location as though the user never switched presentation modes and as if no interruption of the session occurred. Specifically, the user's session could continue not just within the same HTML document, for example, but within the same portion of the document as defined by the fragment identifier stored as part of the state record, and any data already entered could be retained. If the second presentation mode is the screen-based mode, the previously entered data would be filled in on the display.

In short, session manager 18 can maintain the close synchronization that normally exists between a client and a server during a single session to create a transparent and seamless transition from one presentation mode to another, even if synchronization is not maintained between wireless client device 14 and server 12 in a conventional way. This synchronization can be maintained for as long as an operator of the system (i.e., a service provider) maintains state records in memory. As noted above, this period is dependent only on system resources, and may be set by the service provider.

Provided with the present disclosure, those of ordinary skill in the art can readily prepare computer instructions to carry out the foregoing functions. Those of ordinary skill in the art will further realize that it is not always necessary that the functions described are performed in any particular order, or in any particular software module, or that the functions are even segregated into modules.

Exemplary embodiments of the present invention have been described above. Those skilled in the art will understand, however, that changes and modifications may be made to these embodiments without departing from the true scope and spirit of the invention, which is defined by the claims.

We claim:

1. A system for delivering content to a client device while the client device is in a session with a server, the system comprising:

a first presentation system configured to deliver content, formatted for a first presentation mode, to the client device via a wireless access network;

a second presentation system configured to deliver content, formatted for a second presentation mode, to the client device via the wireless access network; and a session manager configured to, during the session:

transmit content from the server to the first presentation system for presentation to the client device in the first presentation mode;

maintain a state record associated with the client device, the state record defining a current state of the session with the server;

receive a mode-switching signal; and responsive to the mode-switching signal, transmit content associated with the current state of the session to the second presentation system for presentation to the client device in the second presentation mode; thereby continuing the session in the current state.

2. The system of claim 1, wherein the session manager is further configured to:

receive a service request from the client device, the service request identifying the client device and the first presentation mode; and in response to the service request:

a) retrieve the state record associated with the client device;

b) identify the current state defined by the state record;

c) continue the session in the current state between the client device and the server; and d) transmit content associated with the current state from the server to the first presentation system for presentation to the client device in the first presentation mode.

3. The system of claim 1, wherein the first presentation system comprises a voice-command platform.

4. The system of claim 1, wherein the second presentation system comprises a data service node.

5. The system of claim 1, wherein the session manager is further configured to query an authentication server in response to a service request from the client device to determine whether the client device is authorized to receive content formatted for at least one of the first and second presentation modes.

6. The system of claim 1, wherein the state record comprises a navigation point, the navigation point identifying a specific resource available from the server.

7. The system of claim 1, wherein the state record comprises a cache of content associated with the state, and wherein the session manager is further configured to transmit the cache of content, for receipt by the client device.

8. The system of claim 1, wherein the session manager is configured to transcode the content into a format compatible with the second presentation system.

9. The system of claim 1, wherein the session manager is configured to transcode the content into a format compatible with the first presentation system.

10. A session manager for managing multi-modal content delivery, the session manager comprising:

a processor;

a memory;

a network interface configured to receive content from a server via a network;

a presentation system interface configured to transmit content to at least a first presentation system and a second presentation system; and program logic stored in the memory and executable by the processor to, during a session between a client device and the server:

transmit content to the first presentation system for presentation to the client device in a first presentation format;

maintain a record of current session state in the memory; and in response to receipt of a mode-switching signal, transmit content associated with the current session state to the second presentation system for presentation to the client device in a second presentation format.

11. The session manager of claim 10, wherein the record of current session state comprises a navigation point, the navigation point identifying a specific resource available from the network.

12. The session manager of claim 11, wherein the record further comprises data entered by the user prior to the receipt of the mode-switching signal.

13. The session manager of claim 12, wherein the program logic stored in the memory and executable by the processor to transmit content associated with the current session state to the second presentation system comprises program logic stored in the memory and executable by the processor to transmit the data entered by the user prior to receipt of the mode-switching signal.

14. The session manager of claim 10, wherein the session manager further comprises program logic stored in the memory and executable by the processor to transcode the content received from the server into a format compatible with the first or the second presentation system.

* * * * *